(12) United States Patent
Page et al.

(10) Patent No.: US 10,267,987 B2
(45) Date of Patent: Apr. 23, 2019

(54) FLAT OPTICAL FIBER LIGHT EMITTERS

(71) Applicant: Lumitex, Inc., Strongsville, OH (US)

(72) Inventors: David J. Page, Painesvile, OH (US); Brian M. Spahnie, Brunswick, OH (US)

(73) Assignee: Lumitex, Inc., Strongsville, OH (US)

( * ) Notice: Subject to any disclaimer, the term of this patent is extended or adjusted under 35 U.S.C. 154(b) by 1306 days.

(21) Appl. No.: 13/872,634

(22) Filed: Apr. 29, 2013

(65) Prior Publication Data

US 2013/0236154 A1 Sep. 12, 2013

Related U.S. Application Data

(60) Continuation of application No. 12/031,740, filed on Feb. 15, 2008, now abandoned, which is a division of application No. 10/900,000, filed on Jul. 27, 2004, now Pat. No. 7,406,245.

(51) Int. Cl.
*G02B 6/10* (2006.01)
*F21V 8/00* (2006.01)

(52) U.S. Cl.
CPC .............. *G02B 6/10* (2013.01); *G02B 6/002* (2013.01); *G02B 6/0036* (2013.01); *G02B 6/0073* (2013.01); *G02B 6/004* (2013.01); *G02B 6/0021* (2013.01)

(58) Field of Classification Search
CPC ........ G02B 6/10; G02B 6/002; G02B 6/0036; G02B 6/0073
See application file for complete search history.

(56) References Cited

U.S. PATENT DOCUMENTS

| | | |
|---|---|---|
| 3,766,376 A | 10/1973 | Sadacca et al. |
| 3,829,675 A | 8/1974 | Mariani |
| 4,265,699 A | 5/1981 | Ladany |
| 4,422,719 A | 12/1983 | Orcutt |
| 5,009,483 A | 4/1991 | Rockwell, III |
| 5,097,396 A | 3/1992 | Myers |
| 5,136,480 A | 8/1992 | Pristash et al. |
| 5,226,105 A | 7/1993 | Myers |

(Continued)

FOREIGN PATENT DOCUMENTS

| | | |
|---|---|---|
| JP | 2004-075217 | 3/1992 |
| JP | 2006-118242 | 4/1994 |

(Continued)

OTHER PUBLICATIONS

U.S. Appl. No. 12/031,740, filed Feb. 15, 2008, (abandoned).
U.S. Appl. No. 10/900,000, filed Jul. 27, 2004, U.S. Pat. No. 7,406,245, Jul. 29, 2008.

*Primary Examiner* — Ryan A Lepisto
*Assistant Examiner* — Erin D Chiem
(74) *Attorney, Agent, or Firm* — Renner, Otto, Boisselle & Sklar, LLP

(57) ABSTRACT

Light emitters are made of one or more cladded flat optical fibers having opposite flat sides and disruptions along at least a portion of the length of the fibers to cause light entering at least one end to be emitted from at least one side. The ends of the flat optical fibers may have substantially the same thickness as a light source and a width substantially equal to or substantially greater than the width of the light source for ease of optically coupling one or more such light sources to the flat optical fiber ends.

11 Claims, 6 Drawing Sheets

(56) References Cited

U.S. PATENT DOCUMENTS

| | | |
|---|---|---|
| 5,312,569 A | 5/1994 | Mezei |
| 5,312,570 A | 5/1994 | Halter |
| 5,432,876 A | 7/1995 | Appeldorn et al. |
| 5,629,997 A | 5/1997 | Hardy, Jr. |
| 5,631,994 A | 5/1997 | Appeldorn et al. |
| 5,659,643 A | 8/1997 | Appeldorn et al. |
| 5,677,688 A * | 10/1997 | O'Mara ............... H03K 17/969 250/227.22 |
| 5,845,025 A | 12/1998 | Garito et al. |
| 5,845,038 A | 12/1998 | Lundin et al. |
| 6,033,604 A | 3/2000 | Lundin et al. |
| 6,079,838 A | 6/2000 | Parker et al. |
| 6,158,867 A | 12/2000 | Parker et al. |
| 6,185,356 B1 | 2/2001 | Parker et al. |
| 6,416,390 B1 | 7/2002 | Mezei et al. |
| 6,565,225 B2 | 5/2003 | Mabuchi et al. |
| 6,591,049 B2 | 7/2003 | Williams et al. |
| 6,606,439 B2 | 8/2003 | Nojiri et al. |
| 6,623,667 B2 | 9/2003 | Lundin |
| 6,712,481 B2 | 3/2004 | Parker et al. |
| 6,874,925 B2 | 4/2005 | Page et al. |
| 7,306,559 B2 | 12/2007 | Williams |
| 2003/0095781 A1 * | 5/2003 | Williams ..................... 385/146 |
| 2004/0264899 A1 | 12/2004 | Peterson, II et al. |

FOREIGN PATENT DOCUMENTS

| | | |
|---|---|---|
| JP | 2004-127931 | 4/2004 |
| JP | 2004-191389 | 7/2004 |
| WO | WO2003/058301 | 7/2003 |

* cited by examiner

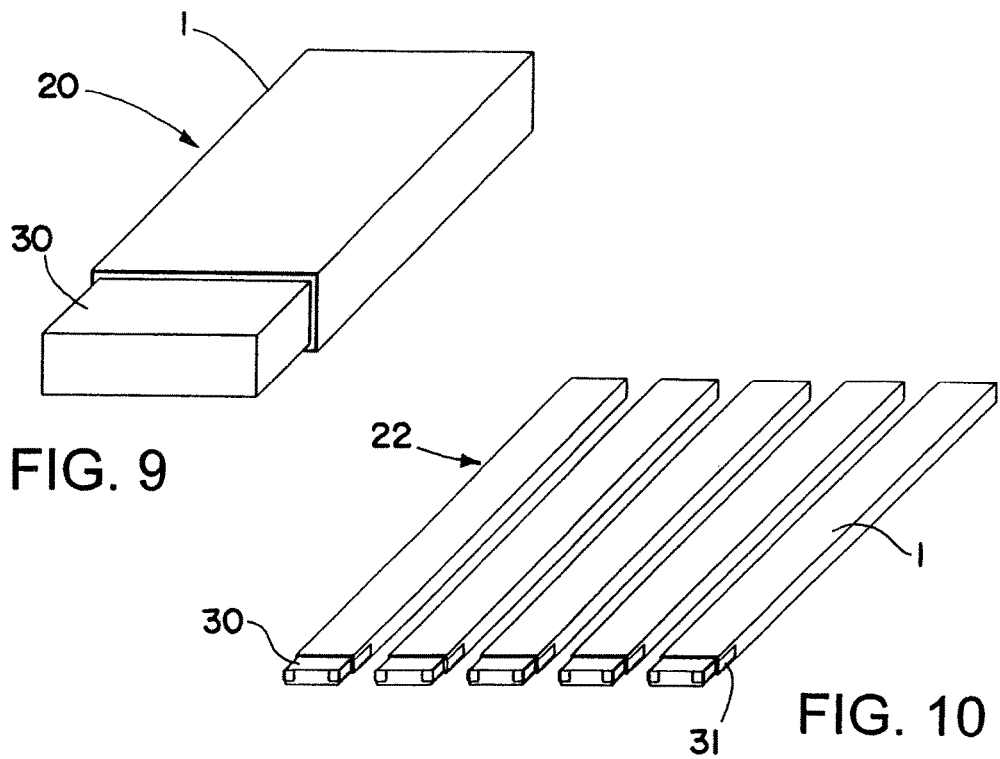
FIG. 9
FIG. 10
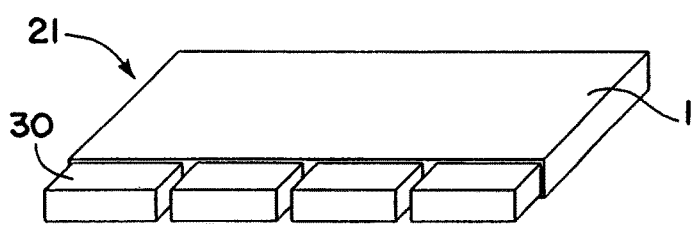
FIG. 11
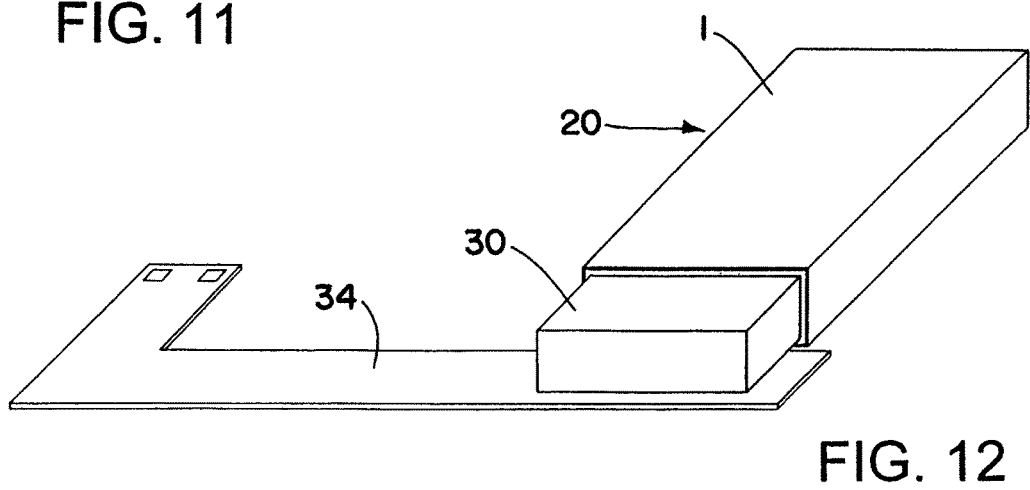
FIG. 12

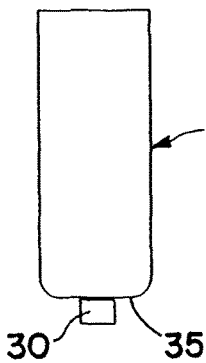 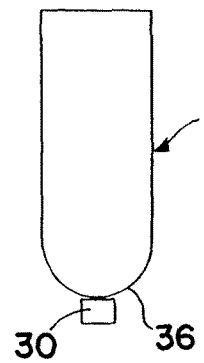 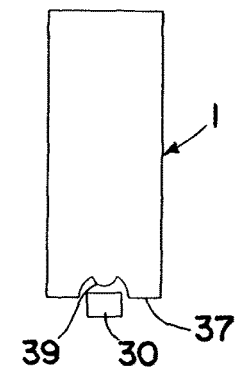 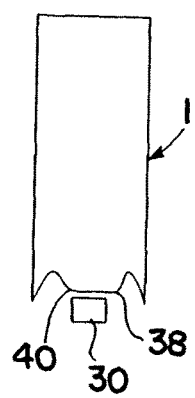
FIG. 17  FIG. 18  FIG. 19  FIG. 20
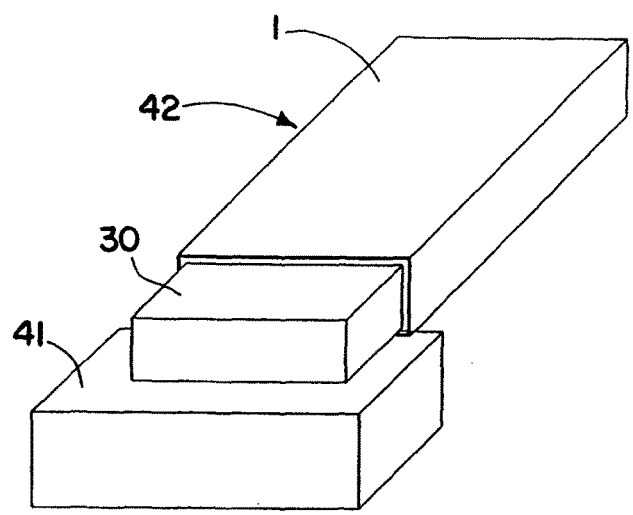
FIG. 21
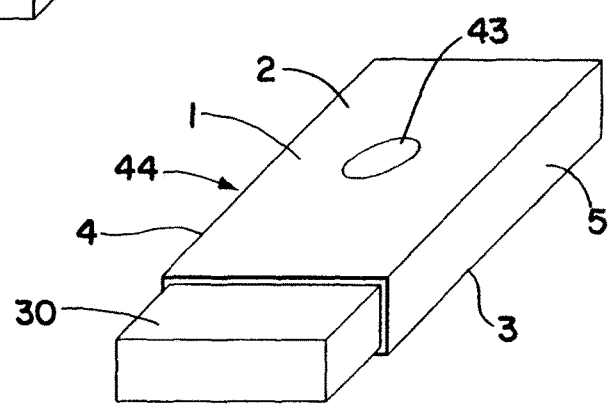
FIG. 22

FLAT OPTICAL FIBER LIGHT EMITTERS

CROSS-REFERENCE TO RELATED APPLICATIONS

This application is a continuation of U.S. patent application Ser. No. 12/031,740, filed Feb. 15, 2008, which is a division of U.S. patent application Ser. No. 10/900,000, filed Jul. 27, 2004, now U.S. Pat. No. 7,406,245, dated Jul. 29, 2008, the entire disclosures of which are incorporated herein by reference.

FIELD OF THE INVENTION

This invention generally relates to light emitting members made of flat optical fibers that emit light received through one or both ends out one or both sides to provide a desired light output distribution.

BACKGROUND OF THE INVENTION

It is generally known to make light emitting members out of light conducting panels, films, sheets, plates and optical fibers. Light entering one or both ends of the light emitting members may be emitted from one or both sides by providing disruptions on one or both sides in a desired pattern.

An advantage in making light emitting members out of panels, films, sheets and plates is that they are relatively inexpensive to make. However, such light emitting panels, films, sheets and plates are not as efficient in transmitting light as light emitting members made out of optical fibers because they lack the cladding that optical fibers have to keep the light in longer and allow the light to be distributed/emitted where desired. Also it is difficult to control the thickness of injection molded light emitting panels, films, sheets and plates because of the stresses that occur in different areas of the light emitting members during cooling after molding.

Heretofore a major drawback in making light emitting members out of optical fibers was the relatively high cost of manufacture. Also because the optical fibers used were round optical fibers of relatively small diameter, only a relatively small surface area of each optical fiber could be disrupted during the manufacturing process as compared to the amount of surface area of light emitting panels, films, sheets and plates that could be disrupted. This limited the relative overall brightness of light emitting members made of optical fibers as compared to light emitting panels, films, sheets and plates for a given light emitting surface area.

Another disadvantage of previous light emitting members made of optical fibers was that the ends of the optical fibers had to be bundled and secured together by a connector assembly that served as an interface between the optical fiber ends and a light source. Also it was difficult efficiently to couple a light source to such bundled optical fiber end portions because of the minute gaps between the optical fiber end portions and the irregular shape of the bundled optical fiber end portions.

There is thus a need for light emitting members that have the attributes of light emitting members made of both panels, films, sheets and plates and optical fibers.

SUMMARY OF THE INVENTION

The light emitting members of the present invention are made out of optical fibers instead of light emitting panels, films, sheets or plates for increased efficiency in keeping the light in longer and allowing the light to be distributed/emitted where desired. However, instead of using round optical fibers, flat optical fibers are used which have the advantage that more surface area of the flat optical fibers can be disrupted using known marring or abrading techniques for increased brightness for a given light emitting surface area.

Another advantage in making light emitting members out of flat optical fibers instead of round optical fibers is that the ends of the flat optical fibers need not be bundled and secured together by a connector assembly to serve as an interface between the fiber ends and the light source as do round optical fibers. Flat optical fibers may be manufactured in different thicknesses and widths to make it easier and more efficient to couple one or more light sources including particularly surface mount light sources such as surface mount light emitting diodes to the flat optical fiber ends. Surface mount light emitting diodes are generally rectangular in cross section, which makes it relatively easy to optically couple them to the ends of flat optical fibers by making the flat optical fibers of substantially the same thickness and either the same or greater width than the light sources. If the flat optical fibers have a width substantially greater than that of the light sources, multiple light sources may be optically coupled to the end of each optical fiber to provide for increased brightness. Also because the ends of the flat optical fibers need not be bundled together by a connector assembly to serve as an interface between the optical fiber ends and the light sources, the need for space to receive and store bundled round optical fiber ends is eliminated.

Still another advantage in making light emitting members out of flat optical fibers instead of round optical fibers is that a fewer number of wider flat optical fibers may be used to produce an equivalent light output. Flat optical fiber light emitters may be comprised of one or more flat optical fibers depending on the light output requirements of the light emitters. Where multiple flat optical fibers are used, the flat optical fibers may be held together or mounted separately and may if desired have gaps therebetween for lighting different areas of a display including for example a liquid crystal display, a graphic overlay or different rows of keys of a keyboard or the like.

In accordance with one aspect of the invention, the light emitting members comprise one or more flat cladded optical fibers having disruptions along at least a portion of their length to cause conducted light to be emitted from at least one of the sides.

In accordance with another aspect of the invention, the disruptions may be formed in one or both sides of the flat optical fibers by roughening, marring, abrading, etching, grit blasting or thermoforming one or both sides of the flat optical fibers.

In accordance with another aspect of the invention, the disruptions may be formed in a single inline process.

In accordance with another aspect of the invention, the light emitting members may comprise a plurality of flat optical fibers held together by an adhesive film or by mechanical clips or fasteners.

In accordance with another aspect of the invention, the flat optical fibers may have gaps therebetween for backlighting different areas of a keyboard or other type of display.

In accordance with another aspect of the invention, the thickness of the flat optical fibers may substantially correspond to the thickness of the light sources including particularly surface mount light sources such as surface mount light emitting diodes (including polymer light emitting diodes and organic light emitting diodes) for ease of optically coupling the light sources to the flat optical fibers.

In accordance with another aspect of the invention, the flat optical fibers may be of different widths which may be the same or greater than the width of the light sources. If the width of the flat optical fibers is substantially greater than that of the light sources, multiple light sources may be optically coupled to each flat optical fiber for increased brightness.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 9 is an enlarged schematic perspective view showing a surface mount light source optically coupled to an end of a flat optical fiber of a light emitting member.

FIG. 10 is an enlarged schematic perspective view showing surface mount light sources optically coupled and mechanically attached to the ends of a plurality of spaced apart flat optical fibers of a light emitting member.

FIG. 11 is a schematic enlarged perspective view showing a plurality of surface mount light sources optically coupled to an end of one flat optical fiber of a light emitting member.

FIGS. 12 and 13 are enlarged schematic perspective views similar to FIGS. 9 and 11 but showing the surface mount light sources surface mounted on a flex circuit or the like.

FIGS. 17-20 are enlarged schematic views showing surface mount light sources optically coupled to an end of flat optical fibers of light emitting members wherein the optical fiber ends have different shapes to redirect or focus the light into the optical fibers.

FIG. 21 is an enlarged schematic perspective view of a surface mount light source optically coupled to an end of a flat optical fiber of a light emitting member similar to FIG. 9 but showing a heat sink in close relation to the light source for cooling the light source.

FIG. 22 is an enlarged schematic perspective view showing a surface mount light source optically coupled to an end of a flat optical fiber of a light emitting member similar to FIG. 9 but showing a hole extending through opposite sides of the optical fiber to permit access to opposite sides of the light emitting member through the hole.

DETAILED DESCRIPTION OF THE INVENTION

Figure 1:
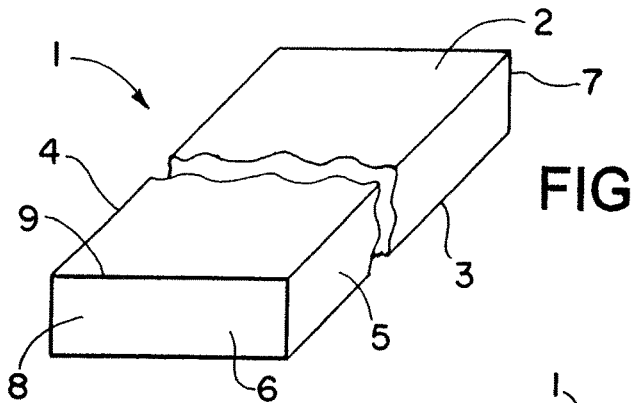
FIG. 1 is an enlarged schematic perspective view of a length of flat optical fiber that may be used to make light emitting members in accordance with the present invention.

Referring now in detail to the drawings, wherein the same reference numbers are used to designate like parts, and initially to FIG. 1, there is shown a flat optical fiber 1 of any desired length having opposite flat sides 2 and 3 and opposite side edges 4 and 5 and ends 6 and 7. The flat optical fiber 1 has a light transmitting core portion 8 made of a suitable optically transparent material such as glass or plastic having the desired optical characteristics and flexibility. Surrounding the core portion 8 is an outer sheath or cladding 9 having an index of refraction that is different than that of the core material, whereby substantially total internal reflection is obtained at the core-cladding interface, as well known in the art.

To cause conducted light entering one or both ends of one or more flat optical fibers 1 to be emitted from one or both sides 2 and 3 thereof, the flat optical fibers may be disrupted at one or more areas along their length as by roughening, marring, abrading, etching, grit blasting or thermally deforming one or both sides. FIGS. 2-5 schematically show one way of disrupting one or both sides of one or more flat optical fibers in a single inline process by passing the flat optical fibers between a pair of rotating pressure rollers 10 and 11.

Figure 2:
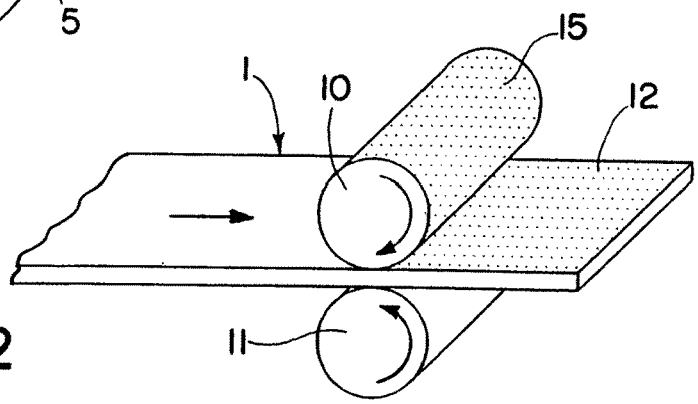
FIG. 2 is a schematic illustration showing one way in which one side of a flat optical fiber (of any desired length) may be disrupted in a single inline process.
Figure 3:
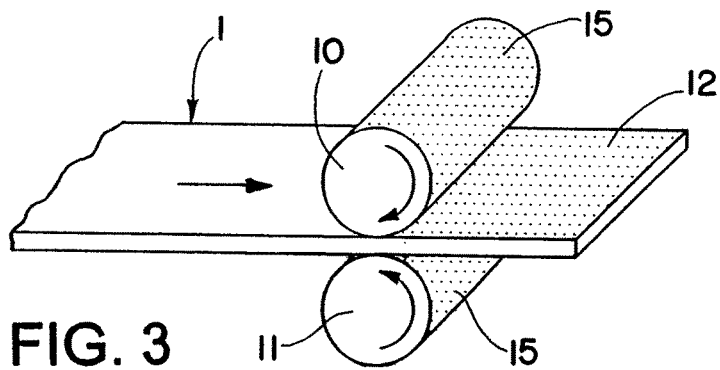
FIG. 3 is a schematic illustration similar to FIG. 2 but showing one way in which both sides of the flat optical fiber may be disrupted in a single inline process.
Figure 4:
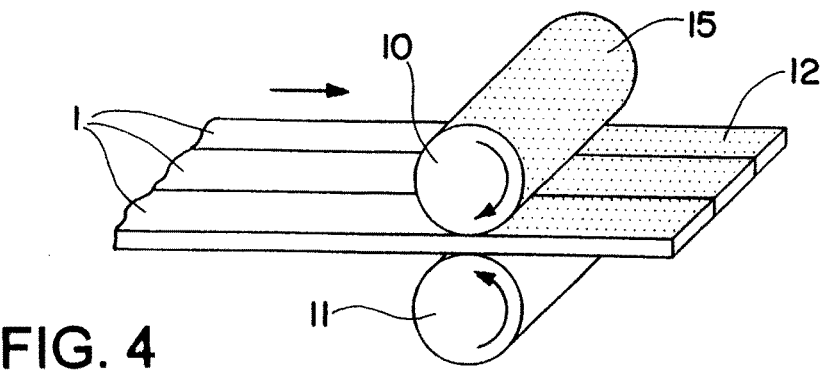
FIG. 4 is a schematic illustration showing one way in which one of the sides of a plurality of flat optical fibers may be disrupted in a single inline process.
Figure 5:
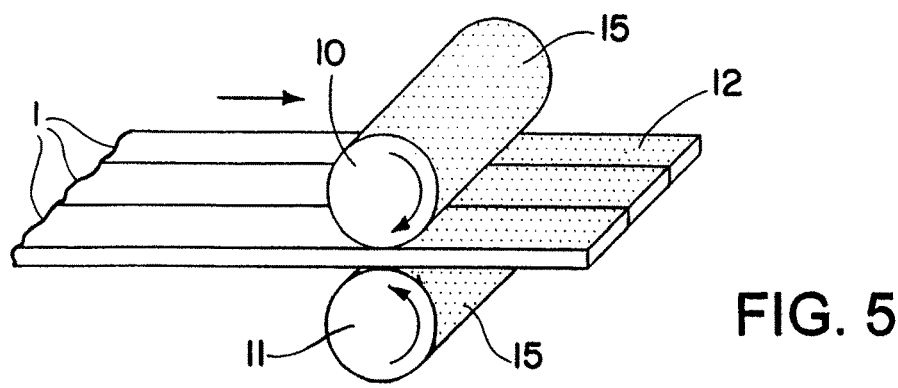
FIG. 5 is a schematic illustration similar to FIG. 4 but showing one way in which both sides of a plurality of flat optical fibers may be disrupted in a single inline process.

One or more flexible flat optical fibers of any desired length may be wound on a spool or spindle (not shown) for ease of handling and storage and pulled off the spool and passed between a pair of opposed pressure rollers to provide disruptions 12 on one or both sides of the fibers. In FIGS. 2 and 4 the surface of only one of the rollers 10 may be roughened or serrated or covered with a diamond coating or grit sandpaper or other suitable abrasive material to provide an abrasive surface 15 thereon for disrupting (e.g., marring or abrading) one side 2 of one or more flat optical fibers during passage between the rollers with the rollers pressing against the fibers in a single inline process. The other roller may be hard or have a deformable cover as desired. In FIGS. 3 and 5, the surface of both rollers 10 and 11 may be provided with an abrasive surface 12 of suitable type for marring or abrading both sides 2 and 3 of one or more flexible flat optical fibers during passage between the rollers with the rollers pressing against the fibers in a single inline process.

The size, depth, density and/or location of the disruptions 12 in one or both sides of the flat optical fibers may be varied as desired as by moving the rollers toward and away from each other during the marring or abrading process to cause conducted light to be emitted from one or both sides of the fibers in a uniform or non-uniform pattern as desired.

Figure 6:
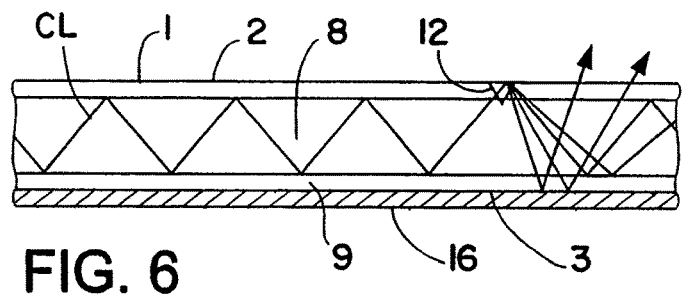
FIG. 6 is an enlarged schematic fragmentary longitudinal section through a flat optical fiber of a light emitting member showing one disruption in one side and a reflective coating in intimate contact with the optical fiber cladding on the other side to cause reflected light to be reflected back toward the one side.
Figure 7:
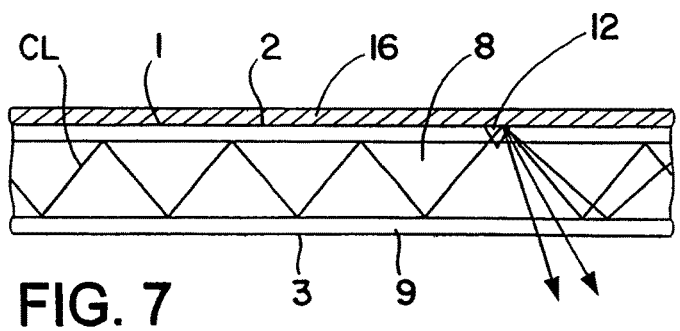
FIG. 7 is an enlarged schematic fragmentary longitudinal section similar to FIG. 6 but showing the reflective coating on the same side of the flat optical fiber as the disruption to cause refracted or reflected light to be reflected back toward the other side.
Figure 8:
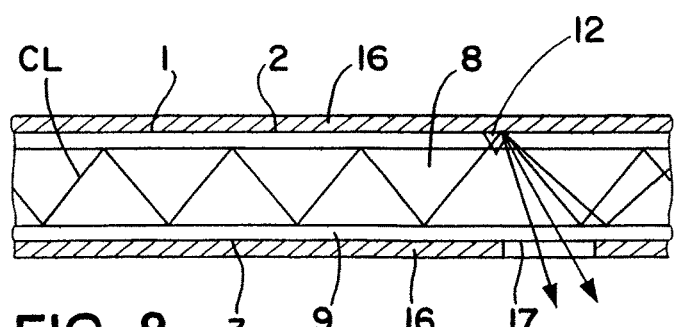
FIG. 8 is an enlarged schematic fragmentary longitudinal section similar to FIG. 7 but additionally showing a reflective coating partially covering the other side of the flat optical fiber leaving areas on the other side uncoated through which refracted or reflected light may be emitted.

A reflective coating may be directly applied in intimate contact to the cladding surface 9 on one side of the flat optical fibers 1 to act as a back reflector for reflecting the conducted light toward the opposite side. FIG. 6 schematically shows a reflective coating 16 in intimate contact with the cladding 9 on the side 3 of the flat optical fiber 1 opposite the side 2 having the disruptions 12 (only one of which is shown) for reflecting conducted light CL back toward the side with the disruptions, whereas FIG. 7 shows the reflective coating 16 in intimate contact with the cladding 9 on the side 2 having the disruptions 12 for reflecting the conducted light CL from that side back toward the other side 3. Also FIG. 8 shows the reflective coating 16 completely covering the side 2 of the flat optical fibers 1 having the disruptions 12 thereon and only partially covering the other side 3 leaving uncovered areas 17 on the other side through which refracted or reflected light may be emitted.

The size (including thickness, width and length) of the flat optical fibers as well as the number of flat optical fibers used to make a particular light emitting member in accordance with the present invention may be varied depending on the particular application, as may the size, type and number of light sources used to supply light to one or both ends of the flat optical fibers. However, the flat optical fibers used to make a particular light emitting member will typically have a thickness of between 0.010 inch and 0.035 inch and a width of between 0.070 inch and 3 inches, with a ratio of thickness to width of less than 0.5. Also the flat optical fibers will typically have a length greater than 5 inches, with a ratio of thickness to length of less than 0.007.

FIGS. 9 and 11 show light emitting members 20 and 21 each comprised of a single flat optical fiber 1 of different widths, lengths and/or thicknesses, whereas FIGS. 10 and 14-16 show light emitting members 22-25, respectively, each comprised of multiple flat optical fibers 1 of different lengths, widths and/or thicknesses. In FIGS. 9, 10, 14 and 15 the flat optical fibers 1 are shown as having a thickness and width substantially corresponding to the thickness and width of a suitable surface mount type light source 30 such as a surface mount light emitting diode (LED) for direct coupling of the light sources to an end of the optical fibers. The flat optical fibers 1 shown in FIGS. 11 and 16 also have a thickness substantially corresponding to the thickness of a surface mount type light source, but have a width substantially greater than the width of a surface mount type light source to permit direct coupling of a plurality of such light sources to an end of each optical fiber.

Figure 14:
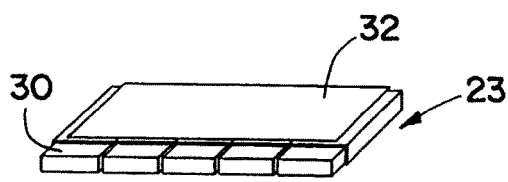
FIG. 14 is an enlarged schematic perspective view showing a plurality of surface mount light sources optically coupled to the ends of a plurality of flat optical fibers of a light emitting member wherein the optical fibers are shown held together by an adhesive film.
Figure 15:
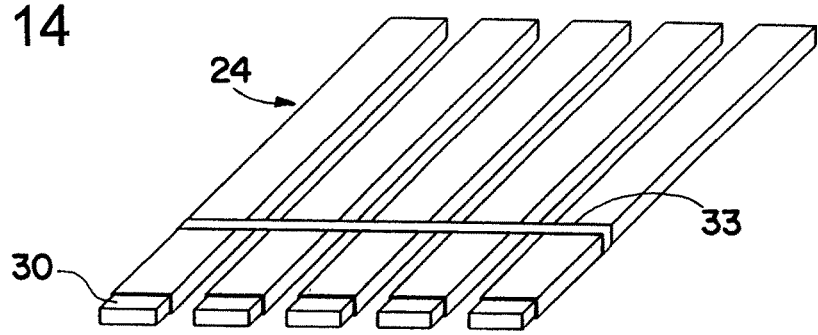
FIG. 15 is an enlarged schematic perspective view showing a plurality of flat optical fibers of a light emitting member held together by a mechanical clip or fastener with gaps between the optical fibers.
Figure 16:
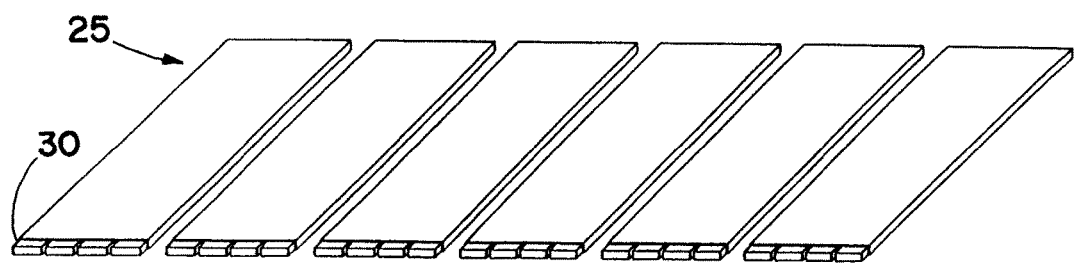
FIG. 16 is an enlarged schematic perspective view showing a plurality of surface mount light sources optically connected to an end of a plurality of flat optical fibers of a light emitting member.

For example, the surface mount type LED 30 may have a rectangular cross-sectional shape with a thickness of approximately 0.030 inch and a width of approximately 0.200 inch, and the flat optical fibers 1 may have substantially the same thickness as the LEDs and either substantially the same width as the LEDs for optically coupling one LED to an end of each flat optical fiber as shown in FIGS. 9, 10, 14 and 15 or a substantially greater width for coupling multiple light sources to an end of each flat optical fiber as shown in FIGS. 11 and 16. As used herein, the term light emitting diode or LED means and includes a standard surface mount type LED as well as a surface mount type polymer light emitting diode (PLED) or surface mount type organic light emitting diode (OLED).

Figure 13:
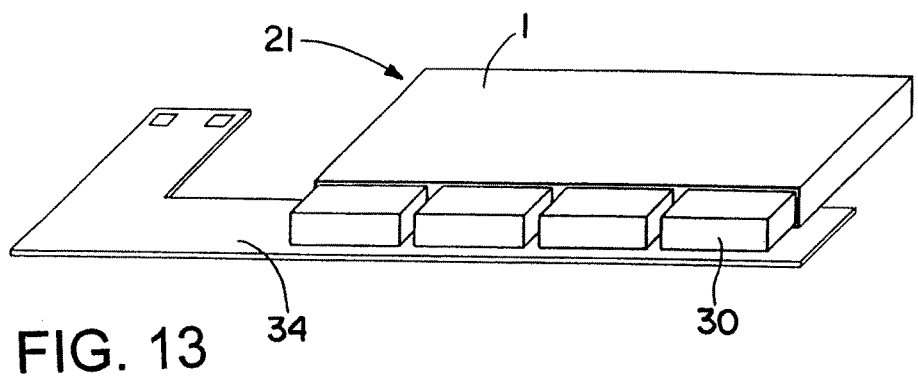

One or more light sources 30 may be attached to an end of one or more flat optical fibers 1 by a mechanical clip or fastener 31 as shown in FIG. 10. Alternatively the light sources 30 may simply be positioned and supported adjacent an end of the flat optical fibers as shown in FIGS. 9, 11, and 14-16. Where the light emitting members are comprised of a plurality of flat optical fibers, the flat optical fibers may be independently positioned and supported relative to one another as shown in FIGS. 10 and 16 or held together by an adhesive film 32 as shown in FIG. 14 or by mechanical clips or fasteners 33 as shown in FIG. 15. In any case, where the light sources are surface mount type light sources, side tabs or bottom contacts (not shown) may be provided on the light sources for surface mounting one or more light sources on a flex strip or other type of flex circuit 34 in close proximity to an end of one or more flat optical fibers as schematically shown in FIGS. 12 and 13.

It is also important to polish the ends of the flat optical fibers to which the light sources are optically coupled for more efficient coupling of the light to the ends of the optical fibers. Moreover, the ends of the flat optical fibers 1 that receive light from one or more light sources may either be substantially flat as schematically shown at 35 in FIG. 17 or lens shaped as schematically shown in FIGS. 18-20 to redirect or focus the light into the ends of the fibers. In FIG. 18 the end 36 of the fiber is shown as being transversely curved across its entire width, whereas in FIGS. 19 and 20 the ends 37 and 38 of the fibers are shown as having different lens shapes 39 and 40 intermediate their width. Also the lens shape 39 is shown in FIG. 16 as being recessed within the end 37 of the fiber.

Figure 23:
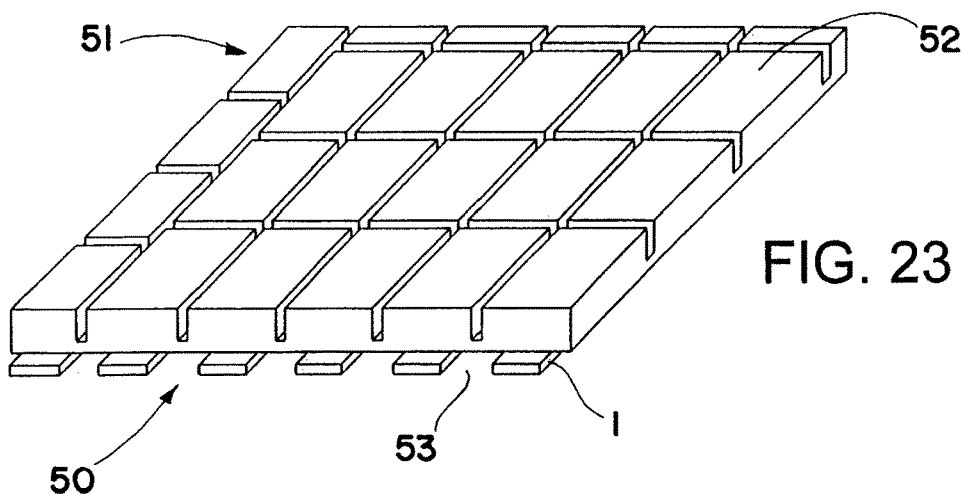
FIG. 23 is an enlarged schematic perspective view showing a plurality of flat optical fibers of a light emitting member extending behind a plurality of rows of keys of a keypad with gaps between the optical fibers corresponding to the spacing between the rows of keys so one of the optical fibers extends behind each row of keys for backlighting one or more keys in each row.
Figure 24:
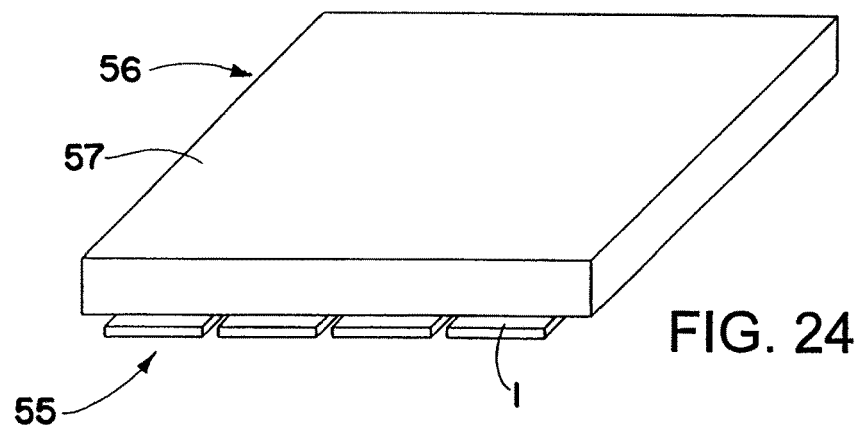
FIG. 24 is an enlarged schematic perspective view showing a plurality of flat optical fibers of a light emitting member backlighting a liquid crystal display.
Figure 25:
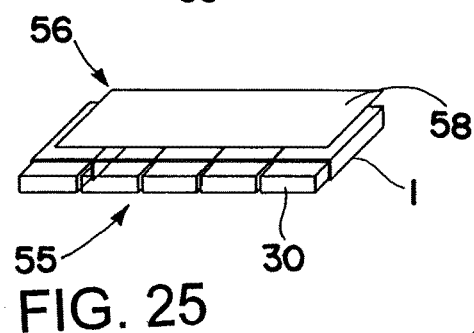
FIG. 25 is an enlarged schematic perspective view showing a plurality of flat optical fibers of a light emitting member backlighting a graphic overlay.

A heat sink 41 may be placed in close proximity to the light source 30 adjacent an end of a flat optical fiber light emitting member 42 as schematically shown in FIG. 21 to aid in cooling the light source. Moreover, a hole 43 may extend through opposite sides of one or more flat optical fibers 1 of a light emitting member 44 intermediate the side edges 4 and 5 of the flat optical fibers as schematically shown in FIG. 22 to permit access to one side of the light emitting member from the other side or vice versa through the hole without interfering with the conduction of light through the particular flat optical fiber containing the hole downstream of the hole.

Where the light emitting members are comprised of a plurality of flat optical fibers, the spacing between the flat optical fibers may be varied as desired to suit a particular application. For example, where such a light emitting member 50 is used to backlight a keypad 51 having a plurality of rows of keys 52, suitable gaps 53 may be provided between the flat optical fibers 1 substantially corresponding to the spacing between a plurality of rows of the keys so the flat optical fibers extend behind a plurality of rows of the keys as schematically shown in FIG. 23 for backlighting one or more keys in each row. In other applications the flat optical fibers 1 that comprise a light emitting member 55 may be placed closer together for backlighting a display 56 such as a liquid crystal display 57 as schematically shown in FIG. 24 or a graphic overlay 58 as schematically shown in FIG. 25.

Figure 26:
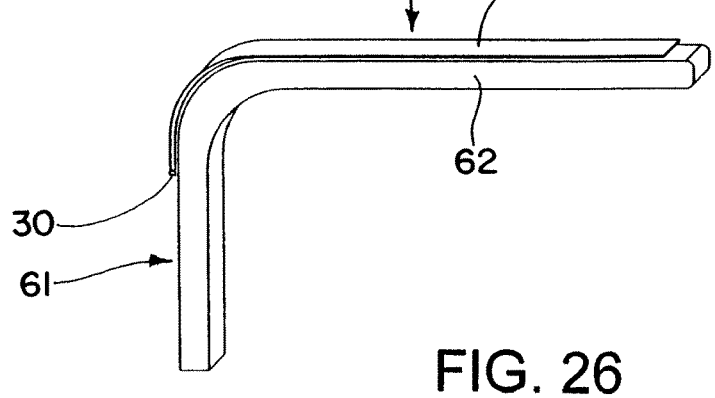
FIG. 26 is an enlarged schematic perspective view showing a flat optical fiber of a light emitting member extending along a surface of a medical instrument such as a retractor for lighting an area adjacent the retractor.

Moreover, the light emitting member 60 may be comprised of a single flat optical fiber 1 having a desired width and length corresponding to the width and length of a portion of a medical instrument 61 such as a retractor blade 62 as schematically shown in FIG. 26. The flat optical fiber 1 may also be bent or flexed to correspond to the shape of the retractor blade or other medical instrument and have a surface mount light source 30 optically coupled to one end of the flat optical fiber 1 as further shown in FIG. 26 for lighting an area adjacent at least a portion of the length of the medical instrument.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. In addition, while a particular feature of the invention may have been disclosed with respect to only one embodiment, such feature may be combined with one or more other features as may be desired or advantageous for any given or particular application.

What is claimed is:

1. A light emitter in combination with a keypad having a plurality of rows of keys, the light emitter comprising a plurality of separate lengths of individual flat optical fibers each having opposite flat sides and opposite side edges and opposite ends, the fibers being disposed in a common plane in side-by-side relation to one another, at least one surface mount light source optically coupled to an end of each of the fibers, each of the fibers having a light conducting core that is cladded by an outer cladding in intimate contact with the light conducting core throughout their lengths without any air gaps therebetween to keep light in for conducting light entering the end of the fibers, and disruptions along at least a portion of the lengths of the fibers to cause conducted light to be emitted from at least one side of each of the fibers, the fibers having gaps therebetween throughout their lengths completely separating the fibers from one another substantially corresponding to the spacing between the plurality of rows of the keys so the fibers extend behind the plurality of rows of the keys, the fibers having disruptions in spaced apart portions of their lengths corresponding to the locations of at least some of the keys in each row for backlighting at least some of the keys in each row.

2. The light emitter and keypad combination of claim 1 wherein the end of at least one of the fibers to which the at least one surface mount light source is optically coupled is lens shaped.

3. The light emitter and keypad combination of claim 2 wherein the end of the at least one fiber to which the at least one surface mount light source is optically coupled is transversely rounded across the width of the fiber.

4. The light emitter and keypad combination of claim 1 wherein the end of at least one of the fibers to which the at least one surface mount light source is optically coupled has a lens shape intermediate the width of the fiber.

5. The light emitter and keypad combination of claim 4 wherein the lens shape is recessed within the end of the at least one fiber to which the at least one surface mount light source is optically coupled.

6. A light emitter comprising at least one flat optical fiber having opposite flat sides and opposite side edges and ends, at least one of the ends being adapted to receive light from a light source for conduction of the light within the fiber, the fiber having a light conducting core that is cladded by an outer cladding in intimate contact with at least one of the sides of the light conducting core without any air gaps therebetween to keep light in for conducting light entering the at least one of the ends of the fiber, deformities in at least one of the sides to cause conducted light to be emitted from at least one of the sides, and a coating in intimate contact with the outer cladding on at least one of the sides.

7. The light emitter of claim 6 wherein the coating is a reflective coating that causes light emitted from the one side to be reflected back toward the other side.

8. The light emitter of claim 6 wherein the deformities are in both sides of the fiber, and the coating is a reflective coating that is in intimate contact with the outer cladding on one of the sides to cause light emitted from the one side to be reflected back toward the other side.

9. The light emitter of claim 6 wherein the outer cladding is in intimate contact with both sides of the light conducting core without any air gaps therebetween, and the coating is a reflective coating that completely covers the outer cladding on one of the sides, and only partially covers the outer cladding on the other side leaving open areas on the other side through which the conducted light is emitted.

10. The light emitter of claim 6 further comprising at least one surface mount light source optically coupled to an end of the fiber, the light source having a thickness substantially corresponding to the thickness of the fiber and having a width equal to or less than the width of the fiber.

11. The light emitter of claim 10 wherein a plurality of surface mount light sources are optically coupled to an end of the fiber, each of the light sources having a width substantially less than the width of the fiber.

* * * * *